July 31, 1923.
W. M. DICKINSON
LEVEL
Filed April 17, 1922
1,463,738
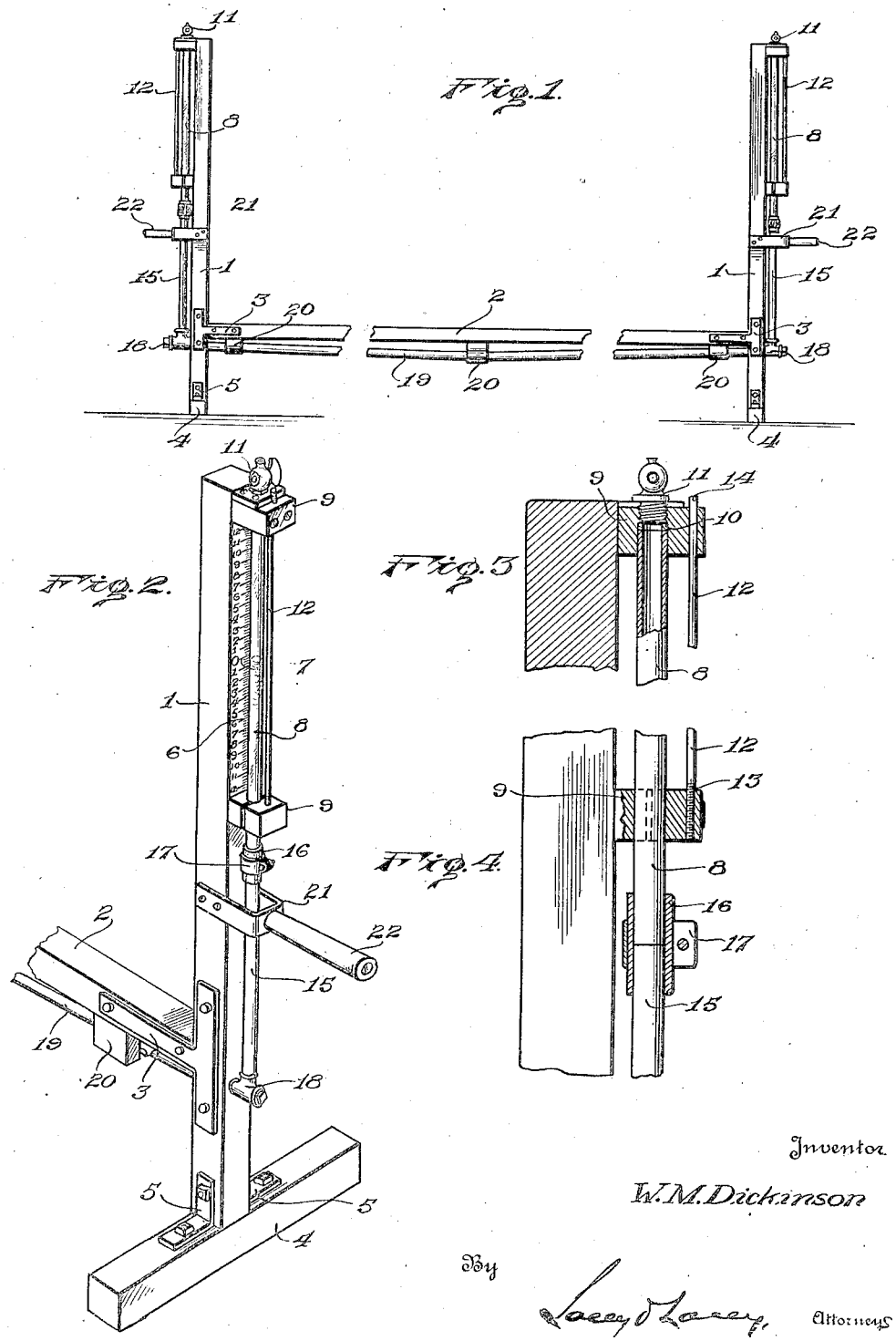
Inventor
W. M. Dickinson
By Lacey & Lacey, Attorneys Patented July 31, 1923.

1,463,738

UNITED STATES PATENT OFFICE.

WALTER M. DICKINSON, OF MIDDLESEX, NORTH CAROLINA.

LEVEL.

Application filed April 17, 1922. Serial No. 553,391.

*To all whom it may concern:*

Be it known that I, WALTER M. DICKINSON, a citizen of the United States, residing at Middlesex, in the county of Nash and State of North Carolina, have invented certain new and useful Improvements in Levels, of which the following is a specification.

This invention relates to levels and has for its object the provision of a simple, inexpensive and efficient device whereby the inclination of the surface of a field may be indicated. The device is especially useful in establishing lines upon farms for terraces, dikes, ditches and all similar operations.

The invention is illustrated in the accompanying drawings, in which—

Figure 1 is a side elevation of a device embodying my improvements;

Fig. 2 is an enlarged detail perspective view of one end of the device;

Fig. 3 is an enlarged detail section showing the upper end of a gage tube;

Fig. 4 is a similar view showing the manner of supporting the lower end of the gage tube.

In carrying out my invention, I employ duplicate standards 1 which are connected near their lower ends by a beam or bar 2 which is rigidly connected at its opposite ends to the respective standards by T-shaped coupling plates 3 secured to the standards and the bar respectively. The standards are also equipped with supporting feet 4 disposed beneath and across the lower ends of the standards and connected therewith by L-shaped brackets 5, as shown and as will be readily understood. Upon the outer face of each standard 1, I mark or secure a scale 6, the graduations of which are numbered upwardly and downwardly from the zero point which is located at the center of the gage, as indicated at 7. Disposed in front of the scale upon each standard is a gage tube 8 of glass or other transparent material supported by brackets or lugs 9 projecting from the face of the standard above and below the scale, as clearly shown. These brackets or lugs are secured to the standards in any convenient or preferred manner and the upper lug or bracket receives the upper end of the gage tube, as shown most clearly in Fig. 3, a packing 10 of some suitable material being disposed at the upper end of the gage tube so that, when a vent cock 11 is fitted in the lug, an air-tight joint will be produced between the inner end of the cock and the upper end of the gage tube. The lower lug or bracket 9 is preferably formed in two mating members which are clamped around the gage tube, and a guard 12 in the form of a metallic rod of small diameter is held by and extends between the said lugs or brackets 9, as clearly shown. This guard is preferably threaded at its lower end, as indicated at 13, and equipped with a notch or slot 14 in its upper end whereby it may be engaged by a screw driver or other turning tool and easily driven into the lower lug so as to be secured therein. The lower end of the gage tube is arranged against and in alinement with the upper end of a pipe 15 and preferably the ends of the tube and pipe abut. A sleeve 16 of rubber or other packing material is fitted around the meeting ends of the tube and the pipe and is clamped about them by a hose clamp 17 which may be of any preferred type. A water-tight joint is thus effected between the tube and the pipe, as will be readily understood. The lower end of the pipe 15 is engaged in a T-coupling 18 which receives the end of a pipe 19 disposed below the bar 2 and establishing communication between the two pipes 15, as will be readily understood. Blocks 20 are secured upon the under side of the beam or bar 2 at the center and adjacent the ends thereof, and these blocks are grooved or slotted in their lower sides to receive the pipe 19, the center block being slightly greater in its vertical dimension than the end blocks so that the pipe 19 is caused to bend slightly and serve as a strut to prevent bending of the bar or beam 2. In the outwardly projecting branch of the T-coupling alined with the pipe 19 is a cut-off plug which is adjustable endwise to effect a rise or fall of the column of water. It is sometimes necessary because of changes in temperature to vary the internal volume of the T-coupling in order to adjust the liquid level to the zero point. The T-coupling with a plug therein provides a simple means for easily affecting this adjustment.

Secured to each standard 1 at any convenient point and projecting outwardly therefrom is a U-shaped bracket 21 from which a handle 22 projects. The handles obviously provide convenient means whereby the users of the device may grasp the same and carry it from point to point where it is to be used.

When the device is to be used, it is placed upon a surface which is known to be level and one vent cock 11 is removed while the other one is opened. Water is then poured into the gage tube 8 from which the vent cock has been removed until the level of the water within both gage tubes appears at the zero point of the respective scales. It will be readily understood that, when the water is poured into one gage tube, it will flow at once into and through the pipe 19 and will rise within the more remote pipe 15 at the same rate that it rises within the pipe 15 alined with the gage tube into which the water is poured. After the water has been brought to the desired zero level, the previously removed vent cock is restored and both vents are closed. Inasmuch as the pressure of air at the two ends of the apparatus is equal, the water will be held at the zero level. When the device has been brought to the place where it is to be used, the vents are opened and the feet 4 placed upon the ground with the bar 2 following the line of the ditch which is to be run. If the surface of the ground is not level, the bar 2 will assume an inclination and this will result in a tilting of the entire device so that the water in one gage tube will fall and in the other gage tube will rise. The difference in the reading indicated by the numerals appearing opposite the surface of the water in the respective tubes will indicate how much of the surface must be filled or cut away to obtain a desired grade or level, and it is, of course, obvious that the degrees into which the scale is graduated may represent inches, feet or any other standard unit. The device is exceedingly simple in its construction and in its use and may be employed upon a farm or any other place for a wide variety of purposes.

Having thus described the invention, what is claimed as new is:

A level comprising a pair of standards, a beam connecting the standards, vertically spaced brackets upon the outer face of each standard, a scale extending between the said brackets and reading in opposite directions from its center, a transparent gage tube disposed in front of the scale upon each standard and supported by the brackets projecting from said standard, a vent cock at the upper end of each gage tube, a pipe carried by the beam and the standards and having upturned portions alined with the respective gage tubes, flexible coupling sleeves encircling the meeting ends of the pipe and the respective gage tubes, clamps around said sleeves, U-shaped brackets secured to the respective standards and projecting outwardly therefrom, and handles projecting from said brackets.

In testimony whereof I affix my signature.

WALTER M. DICKINSON. [L. S.]